Patented Aug. 22, 1944

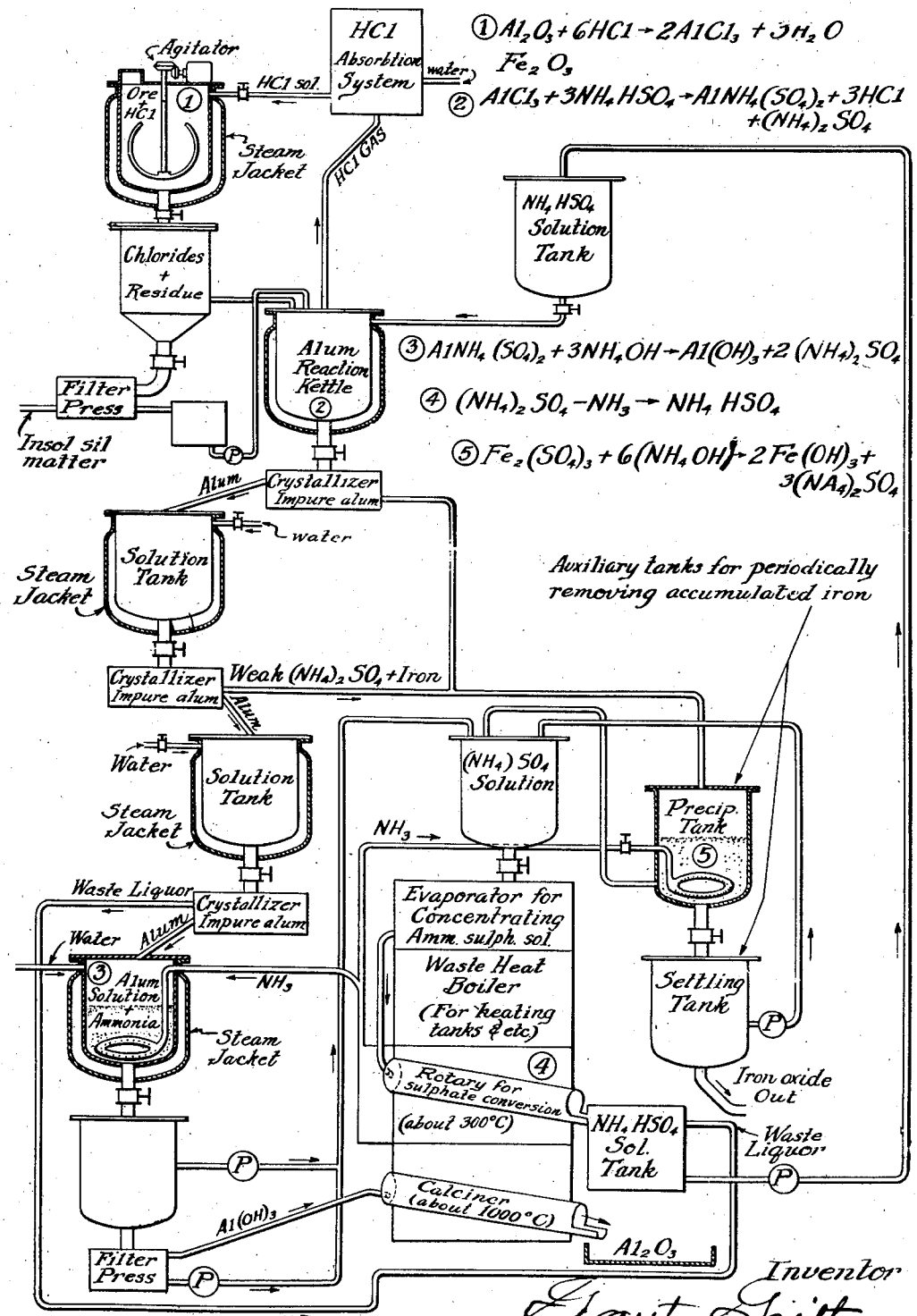

2,356,157

UNITED STATES PATENT OFFICE 2,356,157

PROCESS FOR THE MANUFACTURE OF ALUMINA (METALLURGICAL GRADE) FROM HIGHLY SILICIOUS ALUMINOUS ORES

Gant Gaither, Hopkinsville, Ky.

Application February 3, 1942, Serial No. 429,43

1 Claim. (Cl. 23—141)

This invention relates to a process for the manufacture of alumina (metallurgical grade) from highly silicious aluminous ores.

For many years the only commercially feasible process to produce alumina (metallurgically pure) has been the Bayer alkaline process. This process has the disadvantage in not being able to economically use highly silicious aluminous ores. If the silicious content of the ore is above approximately 6.00%, the use of the alkaline process becomes too costly and these ores become uncommercial.

My discovery relates to the extraction of alumina by an acid process in which process the highly silicious content of the ore makes no material economical difference. In addition to use of the most efficacious acid in my process I have discovered a very economical method of forming the acid for cyclic use. The purification of alumina of contamination (iron and silica especially) is made quite satisfactorily by recrystallization until it becomes metallurgical in grade.

In general terms, I take the aluminous ore, crush it to about 80 mesh and place it in suspension in a digestion tank provided with agitators to maintain suspension. In this tank the suspended crushed ore is leached with warm diluted hydrochloric acid. When this digestion is completed the contents of the digestion tank are drawn off into a settling tank where the silicious residue settles to the bottom. In solution one finds the mixed chlorides of aluminum and iron with minor contamination. When settling has been completed the supernant mixed chloride solution is drawn off into a still for hydrochloric acid reformation. The residue is washed thoroughly to free of entrained mixed chlorides and hydrochloric acid. This wash water is then returned to first digestion tank for suspension of new aluminous ore for hydrochloric acid digestion, or the still. In the still the mixed chlorides are treated with a saturated aqueous solution of acid ammonium sulphate. By the application of heat sufficient to boil the contents of the still, reaction occurs between the chemicals, producing hydrochloric acid which is distilled off as a gas with steam, while iron sulphate, aluminum sulphate and ammonium sulphate are formed, mostly as alums. From this reaction the hydrochloric acid is returned at will either to first digestion tank to attack more aluminous material or to be absorbed to make hydrochloric acid in aqueous solution for storage.

The mixed alums thus in solution in the still are then drawn into an evaporating pan and evaporated to proper Baumé to produce crystallization. These crystals are largely aluminum ammonium sulphate with fractional contaminations of iron and silica, this fraction however being too large at this point for metallurgical grade alumina. The mother liquor left in the first crystallization tank, together with that from the second crystallization tank, to be described below, is conducted to a precipitating tank where iron is eliminated completely by ammonia precipitation. Returning to the first ammonium alum crystals removed from the first crystallizing pan we take these crystals, wash them (saving the wash water) and redissolve in hot aqueous solution and filter. This solution is then placed in a second crystallizing pan. When these crystals are obtained they contain very much less of contaminating iron and silica, but usually are still too high for metallurgical grade. They are removed, put into solution, filtered and carried through a third crystallizing pan. These third crystals are sufficiently free of iron and silica to establish grade. This wash water is usually used as solvent for the ammonium bisulphate.

After the third crystallization the ammonia alum crystals are put into solution and conducted to a precipitation tank where they are treated with ammonia thus precipitating aluminum hydrate and leaving normal ammonium sulphate in solution. The aluminum hydrate is separated by filtration and taken to the calcining kiln where at about 1000 degrees centigrade it is calcined to pure alumina (metallurgical grade). The solution of normal ammonium sulphate is evaporated to dryness and the ammonium sulphate is placed in a continuous furnace operated by waste heat from the calcining furnace at about 300 degrees centigrade, one half the ammonia being driven off, and used in the various precipitation tanks, above described, and leaving acid ammonium sulphate formed in the kiln which is returned after solution to the hydrochloric acid still.

It will be noted that in this process wash waters are not discarded, but constantly used and water is taken out of the cycle only by evaporation thus conserving all dissolved chemicals. The two gases in the process, hydrochloric acid gas and ammonia gas, are fixed immediately after their generation. The hydrochloric acid is fixed either in aqueous solution or by action on aluminous ore, ammonia gas is fixed ordinarily as an ammonium sulphate, or as ammonium hydrate for storage.

It is understood that none of the chemical reactions or physical phenomena involved above are original, but it is my opinion that the sequences and results are productive of metallurgical grade alumina, and have never before been thus discovered.

The chemical equations involved in the above are as follows:

(1) $Al_2O_3 + 6HCl \rightarrow 2AlCl_3 + 3H_2O\ (Fe_2O_3)$ etc.
(2) $AlCl_3 + 3NH_4HSO_4 \rightarrow AlNH_4(SO_4)_2 + 3HCl + (NH_4)_2SO_4$
(3) $AlNH_4(SO_4)_2 + 3NH_4OH \rightarrow Al(OH)_3 + 2(NH_4)_2SO_4$
(4) $(NH_4)_2SO_4 - NH_3 \rightarrow NH_4HSO_4$
(5) $Fe_2(SO_4)_3 + 6NH_4OH \rightarrow 2Fe(OH)_3 + 3(NH_4)_2SO_4$ The numbers refer to the attached flow sheet.

When calcium and magnesium build up heavy, they are discarded from the iron precipitation tank.

What I claim is:

A process for extracting alumina from iron-containing alumina ores which comprises digesting the ore in hydrochloric acid to produce a solution of aluminum and iron chlorides, separating the solution from any undissolved residue, adding ammonium acid sulfate to the solution and heating to drive off hydrochloric acid which is recovered and re-used in digesting more ore, and obtaining a residual solution of mixed sulfates of aluminum, iron, and ammonium, crystallizing ammonium alum from said solution, purifying the ammonium alum to the desired degree by recrystallization; dissolving the recrystallized ammonium alum, precipitating aluminum hydroxide therefrom by introducing ammonia, separating the aluminum hydroxide product from the solution, collecting this solution and the mother liquor from the crystallization of alum and precipitating iron therefrom, leaving a solution containing ammonium sulphate, and heating said solution to recover ammonium acid sulphate and ammonia therefrom for re-use in the process.

GANT GAITHER.